(12) United States Patent
Youssef et al.

(10) Patent No.: US 11,211,184 B2
(45) Date of Patent: Dec. 28, 2021

(54) SYSTEM OF HARNESS AND ENGINE CASE FOR AIRCRAFT ENGINE

(71) Applicant: PRATT & WHITNEY CANADA CORP., Longueuil (CA)

(72) Inventors: Michael Youssef, Longueuil (CA); Olivier Basse, St-Bruno de Montarville (CA); Brant Duke, Lasalle (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 411 days.

(21) Appl. No.: 16/255,444

(22) Filed: Jan. 23, 2019

(65) Prior Publication Data

US 2020/0234849 A1 Jul. 23, 2020

(51) Int. Cl.
| | |
|---|---|
| *H01B 7/18* | (2006.01) |
| *B64D 29/00* | (2006.01) |
| *F01D 25/24* | (2006.01) |
| *H01B 7/00* | (2006.01) |
| *F02K 3/06* | (2006.01) |
| *H01R 4/34* | (2006.01) |

(52) U.S. Cl.
CPC .............. *H01B 7/18* (2013.01); *B64D 29/00* (2013.01); *F01D 25/243* (2013.01); *H01B 7/0045* (2013.01); *F02K 3/06* (2013.01); *F05D 2220/323* (2013.01); *F05D 2240/14* (2013.01); *H01R 4/34* (2013.01)

(58) Field of Classification Search
CPC ... H01B 7/18; H01B 7/17; H01B 7/20; H01B 7/1805; H01B 7/201; H01B 7/29; H01B 9/00; H01B 7/0045; H01B 7/0054; B64D 29/00; F01D 25/243; F02K 3/06; F02K 3/00; F05D 2220/00; F05D 2220/10; F05D 2240/14; F05D 2220/323; H01R 4/34; H01R 4/36; F02C 7/00
USPC ....... 174/68.1, 68.3, 72 A, 59, 2, 5 R, 5 SG, 174/78; 248/68.1, 49
See application file for complete search history.

(56) References Cited

U.S. PATENT DOCUMENTS

| | | |
|---|---|---|
| 5,152,395 A | 10/1992 | Cross |
| 5,196,673 A | 3/1993 | Tanis |
| 5,458,343 A | 10/1995 | Dornfeld et al. |
| 6,230,866 B1 | 5/2001 | Link |
| 6,232,577 B1 | 5/2001 | Reiff |
| 6,745,568 B1 | 6/2004 | Squires |
| 6,848,652 B2 | 2/2005 | Palin et al. |
| 6,863,930 B2 | 3/2005 | Donelon |
| 6,878,873 B2 | 4/2005 | Fryberger, Jr. et al. |

(Continued)

FOREIGN PATENT DOCUMENTS

| | | |
|---|---|---|
| CN | 1155776 A | 7/1997 |
| CN | 102418811 A | 4/2012 |

(Continued)

*Primary Examiner* — Angel R Estrada
(74) *Attorney, Agent, or Firm* — Norton Rose Fulbright Canada LLP

(57) ABSTRACT

An aircraft engine comprises an engine case, the engine case flange(s). A harness of wires extends in proximity to the engine case. The harness of wires includes two or more metal shield sleeves externally covering a bundle of wires in a longitudinal direction, the metal shield sleeves being at least partially electrically insulated from one another. A conductive contact between the at least one flange and at least one of the metal shield sleeve.

20 Claims, 3 Drawing Sheets

(56) References Cited

U.S. PATENT DOCUMENTS

| | | |
|---|---|---|
| 6,891,302 B1 | 5/2005 | Gabrys |
| 7,339,119 B2 | 3/2008 | Hamazu et al. |
| 7,500,644 B2 | 3/2009 | Naudet et al. |
| 7,506,619 B1 | 3/2009 | Lak et al. |
| 7,516,621 B2 | 4/2009 | Suttie et al. |
| 7,534,965 B1 | 5/2009 | Thompson |
| 8,083,557 B2 | 12/2011 | Sullivan |
| 8,140,242 B2 | 3/2012 | Cloft |
| 8,816,711 B2 | 8/2014 | Lyders et al. |
| 9,160,452 B2 | 10/2015 | Louderback et al. |
| 9,345,179 B2 * | 5/2016 | Imahori ............... H05K 9/0007 |
| 9,627,874 B2 | 4/2017 | Cox et al. |
| 9,640,959 B2 | 5/2017 | Pickard et al. |
| 9,725,163 B2 | 8/2017 | Edelson et al. |
| 9,788,447 B2 | 10/2017 | Dalton |
| 9,799,427 B2 * | 10/2017 | Kanagawa ........... H01B 7/0216 |
| 9,828,091 B2 | 11/2017 | Vander Lind et al. |
| 9,836,573 B2 | 12/2017 | Gupte et al. |
| 9,885,313 B2 | 2/2018 | Baltas |
| 9,908,489 B2 | 3/2018 | Shipley et al. |
| 9,963,282 B2 | 5/2018 | Waszkowski |
| 10,124,164 B2 | 11/2018 | Stevenson et al. |
| 10,439,376 B2 * | 10/2019 | Sugino ................ H01B 7/0045 |
| 10,847,282 B2 * | 11/2020 | Izawa ................. H01R 9/0512 |
| 10,916,360 B2 * | 2/2021 | Ito ....................... B60R 16/0215 |
| 2002/0046863 A1 | 4/2002 | Heranney |
| 2005/0198820 A1 | 9/2005 | Kolberg et al. |
| 2006/0277914 A1 | 12/2006 | Kaniut |
| 2011/0000206 A1 | 1/2011 | Aprad |
| 2012/0151934 A1 | 6/2012 | Borissov et al. |
| 2012/0173076 A1 | 7/2012 | Anderson |
| 2014/0116752 A1 | 5/2014 | Sodaro et al. |
| 2015/0192067 A1 | 7/2015 | Jones |
| 2016/0222889 A1 | 8/2016 | Snyder |
| 2017/0130668 A1 | 5/2017 | Takahata |

FOREIGN PATENT DOCUMENTS

| | | |
|---|---|---|
| CN | 103769705 A | 5/2014 |
| CN | 103775139 B | 9/2015 |
| CN | 205382961 U | 7/2016 |
| CN | 106709166 A | 5/2017 |
| CN | 105513850 B | 10/2017 |
| CN | 105618532 B | 11/2017 |
| CN | 106505744 B | 2/2018 |
| EP | 2992199 A2 | 3/2016 |
| FR | 2950205 A1 | 3/2011 |
| FR | 2982088 A1 | 12/2013 |
| GB | 2463867 A | 3/2010 |
| GB | 2504997 A | 2/2014 |
| JP | 2006288107 A | 10/2006 |
| JP | 2007213884 A | 8/2007 |
| JP | 2014076771 A | 5/2014 |
| KR | 101313851 B1 | 10/2013 |
| WO | 2010062788 A2 | 6/2010 |
| WO | 2011024928 A1 | 3/2011 |
| WO | 2017030088 A1 | 2/2017 |

* cited by examiner

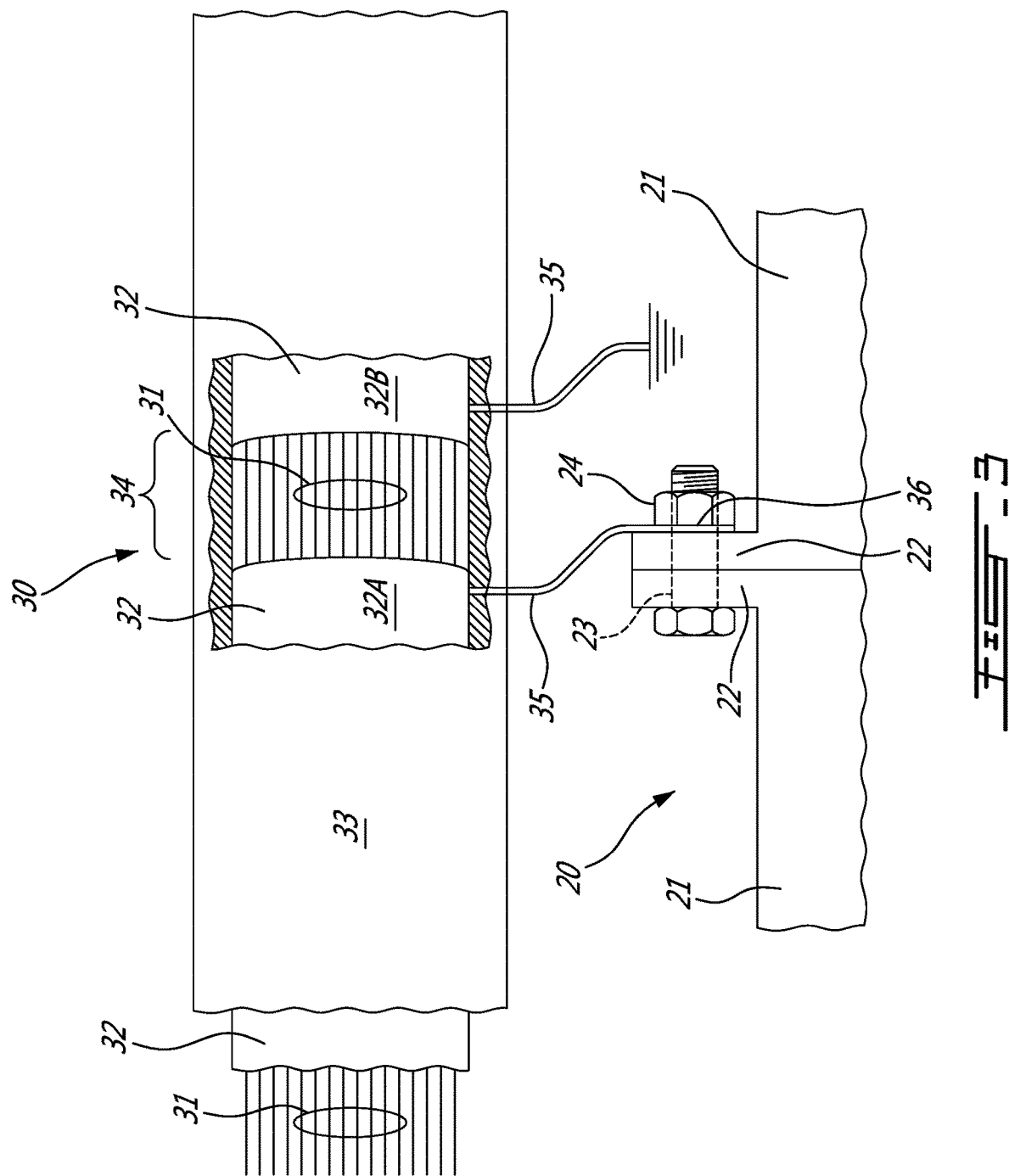

SYSTEM OF HARNESS AND ENGINE CASE FOR AIRCRAFT ENGINE

TECHNICAL FIELD

The application relates to electrical wire harnesses used in gas turbine engines, and to a grounding thereof.

BACKGROUND

Electrical wire harness may be used in gas turbine engines to concurrently route a plurality of wires in a bundle from one location to another. Such electrical wire harnesses may have protective sheathes. For example, outer braids may be used to protect the bundles of wires of a harness from the surrounding environment, and from chafing that may result from relative movement between the harness and surrounding engine components. The relative movement may be a result of thermal expansion, vibrations, etc. As a consequence of the conductivity of metallic fibers conventionally used in outer braids or like protective sleeves for wire bundles, current may flow along electrical wire harnesses.

SUMMARY

In one aspect, there is provided an aircraft engine comprising: an engine case having at least one flange; a harness of wires extending in proximity to the engine case, the harness of wires including a metal shield sleeve externally covering a bundle of wires in a longitudinal direction, at least one break in the metal shield sleeve to provide at least two sleeve segments of the metal shield sleeve longitudinally spaced along the harness of wires; and a conductive contact between the at least one flange and at least one of the sleeve segments.

In one aspect, there is provided an aircraft engine comprising: an engine case, the engine case having at least one flange; a harness of wires extending in proximity to the engine case, the harness of wires including at least two metal shield sleeves externally covering a bundle of wires in a longitudinal direction, the at least two metal shield sleeves being at least partially electrically insulated from one another; and a conductive contact between the at least one flange and at least one of the metal shield sleeve.

DESCRIPTION OF THE DRAWINGS

Reference is now made to the accompanying figures in which:

FIG. 3 is a schematic view of a harness of the system of FIG. 2.

DETAILED DESCRIPTION

Figure 1:
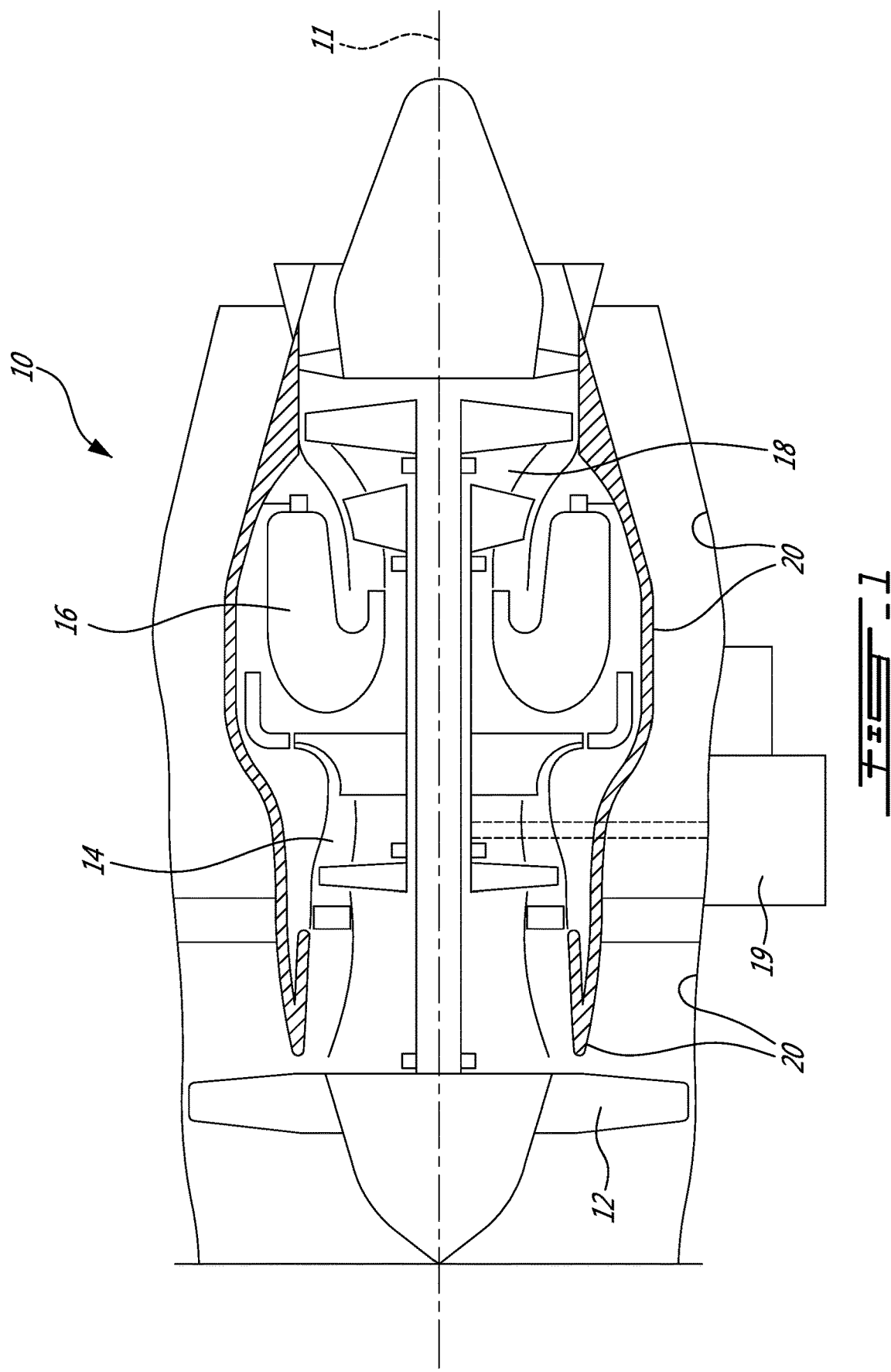
FIG. 1 is a schematic longitudinal section view of a gas turbine engine using a system of harness and engine case in accordance with the present disclosure.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Components of the engine 10 are rotatable about a longitudinal center axis 11 of the engine 10. Engine cases may be shown as 20, including that of a gear box 19. Although the present description uses an aircraft gas turbine for description purposes, the present description is applicable to any aircraft engine, including hybrid/electric engines, for example.

Figure 2:
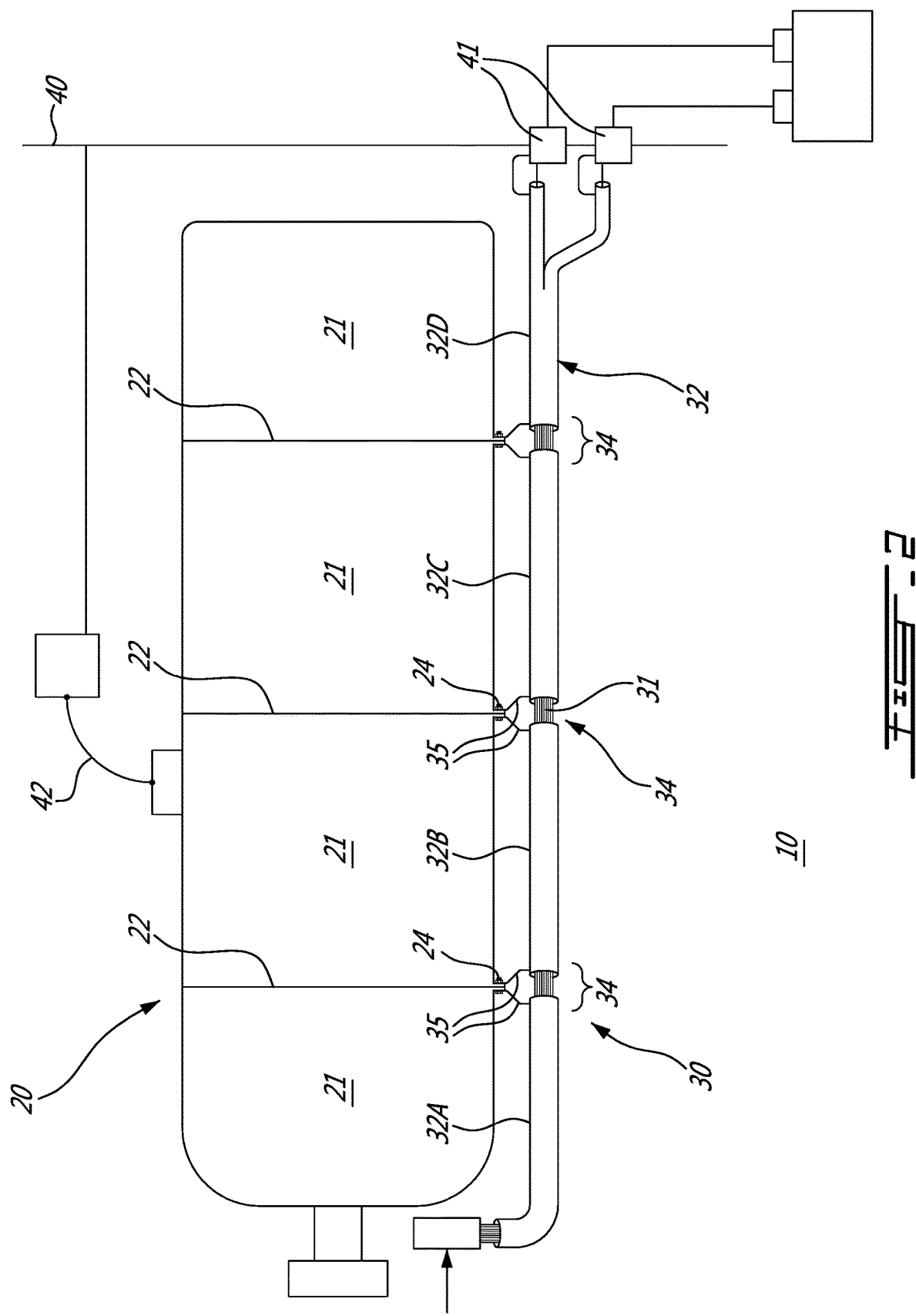
FIG. 2 is a schematic view of a system of harness and engine case in accordance with the present disclosure.

Referring to FIG. 2, an exemplary engine case 20 has case portions 21. FIG. 2 shows four different case portions 21, though fewer or more case portions 21 may be present. The case portions 21 may be known as shells, casings, etc. The case portions 21 may conventionally be made of a metallic material or alloys. In an embodiment, the case portions 21 may be made of other materials as well. The case portions 21 may be interconnected to one another by flanges 22, or other such connection members. The flanges 22 may be a mated flange pair joining annular case sections 21. The flanges 22 may be integral parts of the case portions 21. For example, a case portion 21 is cast with an end flange 22. Case portions 21 may be sheet metal worked into the shells According to an embodiment shown in FIG. 3, adjacent case portions 21 are connected to one another by abutment of end flanges 22. Through holes 23 may be defined in the end flanges 22. The through holes 23 may be in register for fasteners 24 to secure the case portions 21 together. The fasteners 24 may be bolts and nuts, as shown, but other fasteners include screws and other threaded fasteners, rivets, clamps, etc. This arrangement is one among others to fixedly secure case portions 21 together, with other arrangements including welding, brazing, etc.

Referring to FIGS. 2 and 3, a harness is generally shown at 30. The harness 30 may be an electrical wiring harness that regroups a plurality of various wires serving different functions, tens of various wires. In FIG. 3, the wires are generically shown at 31. Exemplary types of wires that may or may not be present in the harness 30 includes individual wires, twist singles (e.g., inner shielded twist singles), twisted pairs (e.g., shielded), and/or twisted triples/triplex (e.g., shielded), among others. Wires may be in various configurations, such as solid-core wires, stranded wires, multiconductor cables, type NM cables. Such wires may usually include a conductor wire (e.g., a metallic wire) with an insulating sheath, wire armouring, bedding, insulation, separation material and/or sleeve (e.g., a rubber or polymer such as polyvinyl chloride (PVC)).

The harness 30 may further have a flexible metal shield sleeve or sheath surrounding and enclosing the bundle of wires 31. The flexible metal shield sleeve 32 may for instance be an outer overbraid 32 (a.k.a, outer braid, shielding braid, metallic braid). The braid 32 may be composed of threads woven tightly around the bundle of wires 31. The braid 32 includes threads of metal, and is therefore conductive. For example, the braid 32 may result from spindle type braiding machine. The overbraid 32 provides a protective layer for the bundle of wires 31, for example to protect the bundle of wires 31 from chafing, heat and/or other wear and tear. The braid 32 or like metal shield sleeve is generally not rigid or flexible, to allow some flexibility in routing the harness 30 from one engine location to another. The harness 30 may further have a protective insulating sheath 33 covering the flexible metal shield sleeve 32. The optional protective insulating sheath 33 may be a rubber or polymer such as polyvinyl chloride (PVC), as examples. As an embodiment, the protective insulating sheath 33 is a tape wound onto the sleeve 32.

One or more breaks 34 are defined in the metal shield sleeve 32, such that the metal shield sleeve is formed of two or more separate segments, shown as 32A, 32B, etc. In the embodiment of FIG. 2, the outer over braid 32 has three breaks 34 along the length of the harness 30. Although the above description refers to the harness having a single metal shield sleeve 32, the segments may also be regarded as distinct metal shield sleeves 32A, 32B, 32C separated from one another by the breaks 34. Such distinct metal shield sleeves 32A, 32B, 32C may hence cover different longitudinal portions of the bundle of wires 31, with no overlap and/or contact between the distinct metal shield sleeves 32A, 32B, 32C. For instance, the bundle of wires 31, from end to end of the harness 30, may have a length $L=L1+L2+L3$, with 32A covering L1, 32B covering L2, and 32C covering L3, and with a first break 34 between 32A and 32B, and a second break 34 between 32B and 32C. The breaks 34 may also be known as discontinuities in the metal shield sleeve 32, as the sleeve 32 is not continuous along the length of the harness 30. The discontinuities are conductive discontinuities, as current may not be conducted along the sleeve 32 due to the break 34. According to an embodiment, the breaks 34 in the harness 30 are of at least 0.2 inch. In an embodiment, the breaks 34 are between 0.3 to 0.5 inch. If the protective insulating sheath 33 is present, it may or may not have a break(s) generally aligned with the break(s) 34. In an embodiment, the protective insulating sheath 33 is continuous, but is pierced for the sleeve 32 to be exposed and/or for a conductor wire to pass through the sheath 33.

On either side of the breaks 34, the shields 32 are grounded to the engine case 20, by way of a conductive contact, at bonding points. For example, the conductive contact may be in the form of a conductor wire 35 (a.k.a., strap, bond strap) whose conducting portion is conductively connected to one of the shield segments (e.g., 32A, 32B, etc) at one end, and to a flange 22 of the engine case 20 at another end. The conductor wire 35 may have an insulating sleeve. The conductor wire 35 may have appropriate connectors to be connected at its opposed ends. For example, the conductor wire 35 may have a terminal lug 36 or bracket to be retained by the fastener 24 as shown in FIG. 3. As another embodiment, the conductive contact may be in the form of a direct conductive contact between the material of the sleeve 32 and that of the flanges 22. As another embodiment, the conductive contact may be in the form of a direct conductive contact between the material of the sleeve 32 with that of metallic stand-off bracket conductively connected to the flange 22.

As shown in FIG. 2, the harness 30 extends in close proximity to the engine case 20. For example, the harness 30 extends along the engine case 20. For example, the harness 30 may extend lengthwise concurrently with the engine case 20. The length of the harness 30 may also be transverse to the engine case 20. The harness 30 may be coupled to connectors 41 in a firewall 40 of the gas turbine engine. The harness 30 may be fabricated, assembled and/or altered for the breaks 34 or for exposed portions of the sleeve 32 to be at locations corresponding to the location of the flanges 22 on the engine case 20 and/or accessory mounting bolt and brackets 24 that are conductive through a bolt. The conductive contact between the segments of the sleeve 32, e.g., at the breaks 34, and additional grounding points aid in diverting current away from the harness 30 onto the engine structure and into engine bond straps 42 and mounts (FIG. 2).

The configuration described with reference to FIGS. 2 and 3, with the locations of the bonding points aligned with the flanges 22 of the engine case portions 21 may facilitate the installation of grounding for the harness 30. For example, minimal additional hardware may be required to benefit from the advantages of bonding of the harness 30. The breaks 34 in the shielding 32 and the ground points promote the current to take the larger skin of the engine diameter, e.g., that of an engine case 20, rather the smaller diameter harness 30. Current traveling along the outer shield 32 of the harness 30 may be forced onto the engine structure through conductive contact 35, and may then tend to remain on the engine structure rather than return back onto the harness 30 through another conductive contact 35 due to the reduced impedance of the larger engine component. According to an embodiment, conductive contact 35 is at one of the breaks 34, and is located aft of the engine mount and engine bond straps to promote the current conducting along the skin of the engine and engine to aircraft bond straps 42 rather than being conducting back onto the harness 30 through conductive wires 35.

The above description is meant to be exemplary only, and one skilled in the art will recognize that changes may be made to the embodiments described without departing from the scope of the invention disclosed. For example, the grounding or bonding arrangement for the harness 30 described above may also be used for other structural components of the gas turbine engine 10, i.e., not necessarily an engine case 20. The approach is applicable to any aircraft engine type, and not uniquely applicable to gas turbine engines. A definition that may be used for the break 34 is an annular gap between two adjacent sleeves 32, sleeve segments of the sleeve 32, the annular gap surrounding the harness (as do the sleeves 32/sleeve segments). The annular gap forms an annular discontinuity in the sleeve 32 for example, resulting in a drop of conductivity. This may be referred to as the two metal shield sleeves 32 being at least partially electrically insulated from one another, i.e., there is at least a drop of conductivity. Still other modifications which fall within the scope of the present invention will be apparent to those skilled in the art, in light of a review of this disclosure, and such modifications are intended to fall within the appended claims.

The invention claimed is:

1. An aircraft engine comprising:
   an engine case having at least one flange;
   a harness of wires extending in proximity to the engine case, the harness of wires including a metal shield sleeve externally covering a bundle of wires in a longitudinal direction, at least one break in the metal shield sleeve to provide at least two sleeve segments of the metal shield sleeve longitudinally spaced along the harness of wires; and
   a conductive contact between the at least one flange and at least one of the sleeve segments.

2. The aircraft engine according to claim 1, wherein the metal shield sleeve is an outer braid with metallic content.

3. The aircraft engine according to claim 1, wherein the at least one break has a size of at least 0.2" between ends of adjacent ones of the separate segments.

4. The aircraft engine according to claim 1, wherein the at least one break has a size of at most 0.5" between ends of adjacent ones of the separate segments.

5. The aircraft engine according to claim 1, wherein the flange includes a mated flange pair joining annular case sections.

6. The aircraft engine according to claim 5, further comprising a connector at a junction between the conductive wire and the at least one flange.

7. The aircraft engine according to claim 6, wherein the connector is a terminal lug.

8. The aircraft engine according to claim 5, wherein the conductive wire has an end connected to or adjacent to an end of one of the separate segments of the metal shield sleeve.

9. The aircraft engine according to claim 1, further comprising an insulating sheath covering the metal shield sleeve and the at least one break, an opening being defined in the insulating sheath for said conductive contact.

10. The aircraft engine according to claim 1, wherein the engine case has a plurality of engine case portions interconnected by flanges, the harness of wires extending along the engine case for one said break to be in proximity to each one of said flanges.

11. An aircraft engine comprising:
   an engine case, the engine case having at least one flange;
   a harness of wires extending in proximity to the engine case, the harness of wires including at least two metal shield sleeves externally covering a bundle of wires in a longitudinal direction, the at least two metal shield sleeves being at least partially electrically insulated from one another; and
   a conductive contact between the at least one flange and at least one of the metal shield sleeve.

12. The aircraft engine according to claim 11, wherein the metal shield sleeves are outer braids with metallic content.

13. The aircraft engine according to claim 11, wherein the electrical insulation is provided by a separation between adjacent ends of the metal shield sleeves has a size of at least 0.2" between ends of adjacent ones of the separate segments.

14. The aircraft engine according to claim 11, wherein the separation has a size of at most 0.5" between said adjacent ends.

15. The aircraft engine according to claim 11, wherein the flange is a mated flange pair connecting annular engine case portions.

16. The aircraft engine according to claim 11, further comprising a connector at a junction between a conductive wire and the at least one flange.

17. The aircraft engine according to claim 16, wherein the connector is a terminal lug.

18. The aircraft engine according to claim 15, wherein the conductive wire has an end connected to or adjacent to an end of one of the metal shield sleeves.

19. The aircraft engine according to claim 11, further comprising an insulating sheath covering the metal shield sleeves and a separation therebetween, an opening being defined in the insulating sheath for said conductive contact.

20. The aircraft engine according to claim 11, wherein the engine case has a plurality of engine case portions interconnected by flanges, the harness of wires extending along the engine case for separations between adjacent ends of metal shield sleeves to be in proximity to each one of said flanges.

* * * * *